July 2, 1929. P. M. LOCKWOOD 1,718,969
TIRE COVER
Filed June 13, 1927
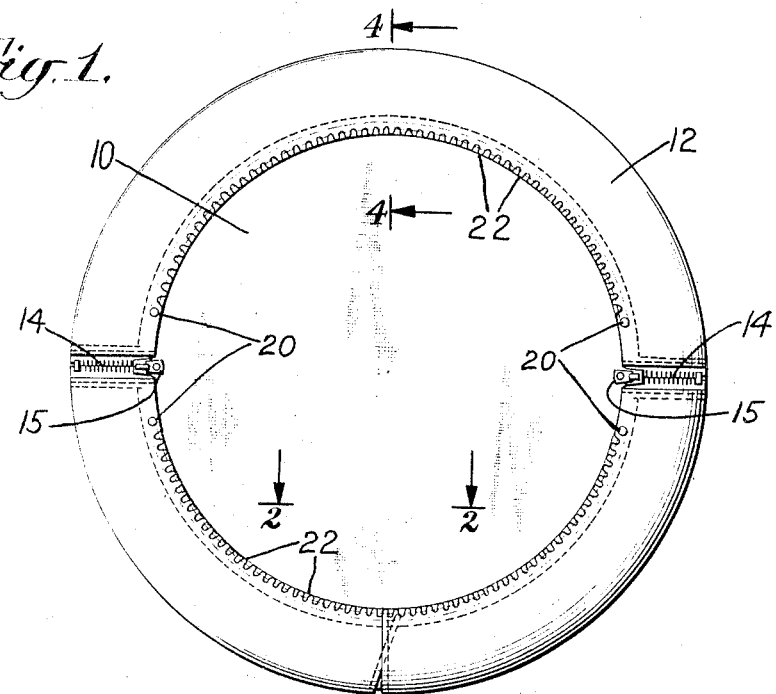
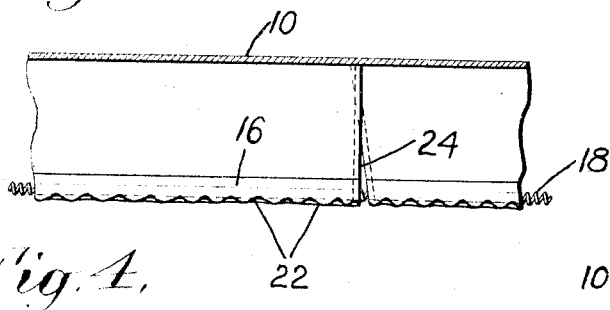
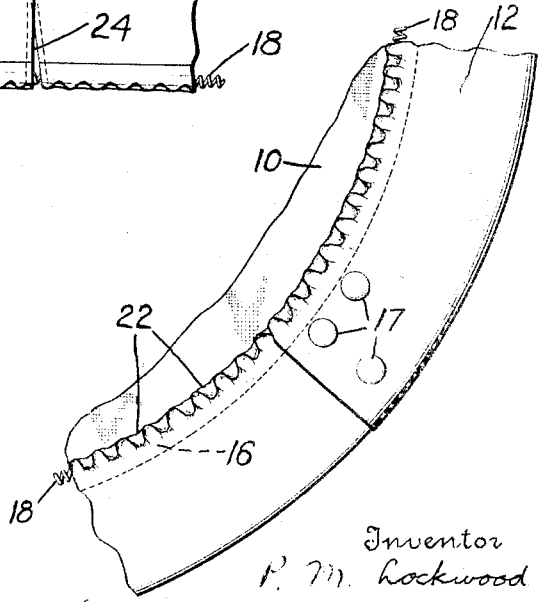
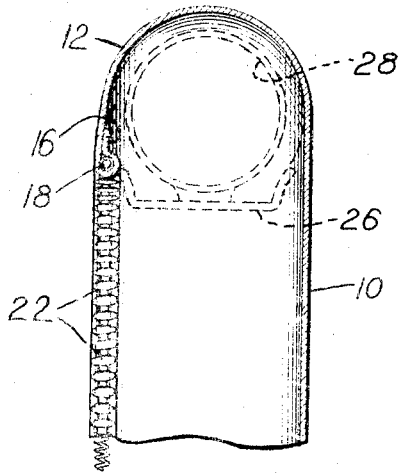

Patented July 2, 1929.

1,718,969

UNITED STATES PATENT OFFICE.

PAUL MINER LOCKWOOD, OF IRVINGTON, NEW JERSEY.

TIRE COVER.

Application filed June 13, 1927. Serial No. 198,335.

This invention pertains to covers for spare tires carried on automobiles.

Great difficulty has been encountered with tire covers as heretofore made in putting them in place on the tire. In order to insure neat and attractive appearance it is necessary that the cover be fitted rather snugly to the tire. In order to enable the operator to put the cover in place on the tire, it has been customary to provide the cover with a button joint to permit first opening up the cover and then fastening its ends together after it is in place. However, even with such an arrangement it is often necessary to deflate the tire before the joint in the cover can be closed, on account of the friction between cover and tire, which prevents the cover sliding on the tire.

The object of this invention is to provide a tire cover which may easily be put in place without deflating the tire and without much effort on the part of the operator; which will be of attractive appearance; and which will maintain its proper shape in service, even if frequently removed and replaced.

More specifically, the object of the invention is to provide the inner portion of the cover, that is, the portion on the side nearest to the automobile, with a plurality of joints which may be opened or closed by the operator, and to make the inner rim of the inner cover elastic or resilient in order that the joints may be easily closed and in order that the inner rim may always remain taut.

Further and other objects and advantages will be hereinafter set forth in the accompanying specification and claims, and shown in the drawings, which by way of illustration show what is now considered to be the preferred embodiment of the invention.

Fig. 1 is a view of the tire cover as it appears from the inner side.

Fig. 2 is a view on the line 2—2 of Fig. 1.

Fig. 3 is a fragmentary view showing an optional type of joint.

Fig. 4 is an enlarged sectional view on the line 4—4 of Fig. 1.

The outer portion 10 of the cover may either extend entirely across the tire, or its center may be cut out, as is often the case, so that the outer cover is only a ring of about the same general shape and dimensions as the inner portion 12 of the cover. For brevity and clarity of description, the portion of the cover to the left of the center line in Fig. 4 will be called the "inner cover" and the portion to the right of the center line will be called the "outer cover".

The inner cover, as illustrated, is provided with a plurality of joints 14. The drawings show two joints, one at each side. These joints are preferably fitted with hookless fasteners operable by the tabs 15 in a well known manner, but the joints may be made, if desired, with buttons or snap fasteners 17 as shown in Fig. 3.

The inner rim of each section of the inner cover is folded over as at 16 (Fig. 4) to form a hem, through which is drawn a coil spring 18, an elastic band, or some other resilient material. The resilient member is fastened at both ends to the inner cover by rivets 20 or other appropriate device. The surplus material in the hem causes the inner rim to crimp as shown at 22.

The lower portion of the casing is provided at 24 with an opening for draining water which may enter the cover when rained upon or when washed.

In Fig. 4 the wheel rim is shown by dotted outline 26 and the tire by dotted outline 28.

To place the cover in position on the tire, the joints in the inner cover are unbuttoned or opened by sliding tabs 15 outwardly. The inner cover is then thrown back and the cover placed on the tire with the outer cover in proper position. Then the inner cover is folded back into position and the joints 14 are closed. The closing of the joints is easily accomplished on account of the resiliency of the inner rim.

The inner rims of ordinary tire covers usually become stretched and flabby in use, but this drawback is avoided by the present construction because the resilient member always keeps the inner rim taut and neat.

It is to be understood that the invention is not limited to the specific construction herein illustrated and described but can be embodied in other forms without departure from its spirit as defined by the following claims.

I claim—

1. A cover for a spare tire for an automobile comprising portions for covering the tread and sides of the tire, the portion covering one of the sides being in sections extending from the tread portion, means for securing the sections together when applying the cover, and resilient means in each section placed under tension as an incident to securing the sections together and serving to draw the cover close to the tire.

2. A cover for a spare tire for an automobile comprising continuous portions for covering the tread and one side of the tire, sections extending from the continuous portions for covering the other side of the tire, means for securing the sections together when covering the tire, resilient means along the inner edges of the sections placed under tension as an incident to securing the sections together, and a drain in the tread covering portion of the cover.

3. A cover for a spare tire for an automobile comprising, a continuous portion for covering the tread and one side of the tire and a portion divided along radial lines to form sections for covering the other side of the tire, means for securing the sections together when covering the tire, and a plurality of springs placed under tension as an incident to securing the sections together serving to draw the cover taut over the tire.

In testimony whereof I hereto affix my signature.

PAUL MINER LOCKWOOD.